United States Patent
Hagihara et al.

(10) Patent No.: US 10,047,483 B2
(45) Date of Patent: Aug. 14, 2018

(54) GLASS INTERLEAVING PAPER

(71) Applicant: Oji Holdings Corporation, Tokyo (JP)

(72) Inventors: Koichi Hagihara, Tokyo (JP); Kei Yawata, Tokyo (JP); Takumi Takahashi, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 0 days.

(21) Appl. No.: 15/320,706

(22) PCT Filed: Jun. 15, 2015

(86) PCT No.: PCT/JP2015/067209
§ 371 (c)(1),
(2) Date: Dec. 20, 2016

(87) PCT Pub. No.: WO2015/194511
PCT Pub. Date: Dec. 23, 2015

(65) Prior Publication Data
US 2017/0152633 A1    Jun. 1, 2017

(30) Foreign Application Priority Data

Jun. 20, 2014  (JP) .................... 2014-127141

(51) Int. Cl.
| | | |
|---|---|---|
| *D21H 27/10* | (2006.01) | |
| *B65D 85/48* | (2006.01) | |
| *C03B 40/033* | (2006.01) | |
| *D21H 27/00* | (2006.01) | |
| *D21H 17/13* | (2006.01) | |
| *B65G 49/06* | (2006.01) | |
| *D21H 11/02* | (2006.01) | |
| *D21H 11/08* | (2006.01) | |
| *D21H 11/10* | (2006.01) | |
| *D21H 17/67* | (2006.01) | |
| *B65D 57/00* | (2006.01) | |

(52) U.S. Cl.
CPC ............ *D21H 27/10* (2013.01); *B65D 85/48* (2013.01); *B65G 49/069* (2013.01); *C03B 40/033* (2013.01); *D21H 11/02* (2013.01); *D21H 11/08* (2013.01); *D21H 11/10* (2013.01); *D21H 17/13* (2013.01); *D21H 17/675* (2013.01); *D21H 27/00* (2013.01); *B65D 57/00* (2013.01); *Y02P 40/57* (2015.11)

(58) Field of Classification Search
CPC ........ D21H 27/10; D21H 11/02; D21H 11/08; D21H 11/10; D21H 17/13; D21H 17/675; D21H 27/00; B65D 57/00; B65D 85/48; B65G 49/069; Y02P 40/57
USPC ..................................................... 428/537.5
See application file for complete search history.

(56) References Cited

U.S. PATENT DOCUMENTS 7,306,701 B2   12/2007  Blum et al.
2017/0073897 A1*  3/2017  Akahori ................. D21H 27/00

FOREIGN PATENT DOCUMENTS

| | | |
|---|---|---|
| CN | 1291104 C | 12/2006 |
| JP | A-2006-044674 | 2/2006 |
| JP | 2007-70752 * | 3/2007 |
| JP | A-2007-70752 | 3/2007 |
| JP | 2007-131965 * | 5/2007 |
| JP | A-2007-131965 | 5/2007 |
| JP | 2008-297661 * | 12/2008 |
| JP | A-2008-297661 | 12/2008 |
| JP | A-2009-184704 | 8/2009 |
| JP | A-2010-242057 | 10/2010 |
| JP | A-2014-118663 | 6/2014 |
| WO | WO 2014/098162 A1 | 6/2014 |
| WO | WO 2014/104187 A1 | 7/2014 |
| WO | 2015/137488 A1 | 9/2015 |
| WO | WO2015/137488 * | 9/2015 |

OTHER PUBLICATIONS

International Search Report and Written Opinion for PCT/JP2015/067209 (dated Sep. 15, 2015).
Office Action for Japanese Patent Application No. 2014-127141 (dated Mar. 28, 2017).
Office Action for Taiwanese Patent Application No. 10520955040 (dated Aug. 2, 2016).

* cited by examiner

*Primary Examiner* — Leszek Kiliman
(74) *Attorney, Agent, or Firm* — Merchant & Gould P.C.

(57) ABSTRACT

Provided is a glass interleaving paper capable of suppressing scratches on surfaces of glass plates in a manufacturing process or a distribution process for storing and transporting a plurality of stacked glass plates. The glass interleaving paper is characterized in that a main component is cellulose pulp, a basis weight is 10 to 100 g/m$^2$, and content of mineral having a Mohs hardness of at least 5 is 400 ppm or less. When the mineral having a Mohs hardness of at least 5 is a silicate mineral, the glass interleaving paper is more useful.

7 Claims, No Drawings

GLASS INTERLEAVING PAPER

This application is a U.S. National Stage Application under 35 U.S.C. § 371 of International Patent Application No. PCT/JP2015/067209 filed Jun. 15, 2015, which claims the benefit of priority to Japanese Patent Application No. 2014-127141 filed Jun. 20, 2014, the disclosures of all of which are hereby incorporated by reference in their entireties. The International Application was published in Japanese on Dec. 23, 2015 as WO 2015/194511.

TECHNICAL FIELD

The present invention relates to a glass interleaving paper to be used by being inserted between glass plates.

BACKGROUND

The glass interleaving paper is used in order to protect the glass plates in a manufacturing process or a distribution process for storing and transporting a plurality of stacked glass plates for flat panel display such as a liquid crystal display panel and a plasma display panel.

The glass plate used as a substrate material for the flat panel display requires higher surface smoothness than that of a general architectural window glass plate, a vehicle window glass plate or the like. Since the glass plate for the flat panel display is formed with electronic members and the like as a thin film on a surface thereof, surface flatness and cleanliness required for the surface thereof is extremely higher than that of the glass plate used for other applications. When even slight damage or contamination occurs in the glass plate for flat panel display, for example, by contact with other glass plates, there is a possibility to cause performance problems as the display.

Further, in recent years, the glass plates have been transported by stacking them as much as possible in order to improve transport efficiency in accordance with increase in size and mass production of the glass plate, and thus a contact area with the glass interleaving paper tends to increase. When the contact area or contact pressure between the glass plate and the glass interleaving paper is increased, scratches are more likely to occur by foreign matter or the like existing in the glass interleaving paper.

Therefore, the glass interleaving paper which is inserted between the glass plates has been requiring high quality.

In order to reduce scratches caused by the glass interleaving paper, for example, Patent Document 1 discloses a glass interleaving paper which is mainly made of pulp and is excellent in uniformity of paper thickness. This glass interleaving paper is characterized in that its basis weight is 30 to 60 g/m$^2$, a maximum paper thickness difference between adjacent measurement points is 8 μm or less, and a difference between maximum and minimum values of paper thickness is 16 μm or less.

Patent Document 2 discloses a technology of improving cushioning properties to suppress scratches from occurring on the surface of the glass plate by defining mixing ratio of various pulps to produce a glass interleaving paper having a compression work amount of at least 0.15 J/m$^2$ and a compression recovery rate of at least 50%.

Further, Patent Document 3 discloses a glass substrate interleaving paper made of a polyethylene resin foam sheet having a thickness of 0.3 to 1.5 mm, wherein a density, an impact strength, a flexural modulus and a molecular weight distribution of a resin composition, a change rate of contact angle of water, and the like, are within predetermined ranges.

CITATION LIST

Patent Literature

[Patent Document 1]
Japanese Patent Application Publication No. 2009-184704
[Patent Document 2]
Japanese Patent Application Publication No. 2006-044674
[Patent Document 3]
Japanese Patent Application Publication No. 2010-242057

SUMMARY OF INVENTION

Technical Problem

The above-described prior art is, for example, intended to prevent scratches or to improve contamination resistance or adhesion properties by improving physical properties or form of the glass interleaving paper, and is not necessarily sufficient as a direct countermeasure against a cause of occurrence of scratches on the glass plates.

The present invention has been made in view of such circumstances. An object of the present invention is to provide a glass interleaving paper capable of suppressing scratches on the surface of the glass plate in a manufacturing process or a distribution process for storing and transporting a plurality of stacked glass plates.

Solution to Problem

As a result of analysis and study of occurrence factor of scratches caused by the glass interleaving paper, the present inventors have found that a specific fine particle existing in the glass interleaving paper is a main cause of the scratches, to make the present invention. That is, the present invention is a glass interleaving paper having the following composition.

(1) A glass interleaving paper, wherein a main component is cellulose pulp, a basis weight is 10 to 100 g/m$^2$, and content of mineral having a Mohs hardness of at least 5 is 400 ppm or less.

(2) The glass interleaving paper according to the above (1), wherein the mineral having a Mohs hardness of at least 5 is a silicate mineral.

(3) The glass interleaving paper according to the above (1) or (2), wherein the mineral having a Mohs hardness of at least 5 is a crystalline silica.

(4) The glass interleaving paper according to the above (1) to (3), wherein content of the mineral having a Mohs hardness of at least 5 is 100 ppm or less.

Advantageous Effects of Invention

With the glass interleaving paper of the present invention, it is possible to suppress scratches on the surface of the glass plate in the distribution process for storing and transporting the plurality of stacked glass plates.

DESCRIPTION OF EMBODIMENTS

Hereinafter, embodiments of the present invention will be described in detail. The present invention is not to be construed as being limited to these embodiments.

The present inventors have studied causes of scratches generated on a surface of a glass plate for a flat panel display. As a result, we have found that there are mineral particles having a higher hardness than glass Mohs hardness (4.5 to 6.5) in a glass interleaving paper, and it is a main cause of generating the scratches on the surface of the glass plate that the mineral particles are applied to the surface of the glass plate.

As a result of further study based on the above findings, we have found that it is possible to suppress the scratches on the surface of the glass plate during storage and transportation by reducing content of the mineral, which is present in the glass interleaving paper and has a high Mohs hardness, to a certain amount or less. The Mohs hardness of the mineral having a high Mohs hardness is at least 5.

Further, in a specific use of the flat panel display, in order to suppress the scratches on the surface of the glass plate to a level not causing a practical problem, we have studied allowable content of the mineral having a Mohs hardness of at least 5. As a result, we have found that the content of the mineral is required to be 400 ppm or less. The content of the mineral is more preferably 100 ppm or less.

There is a silicate mineral as a typical mineral having a Mohs hardness of at least 5. There are many types of silicate minerals. In particular, there are nesosilicate mineral (olivine group, garnet group or the like), sorosilicate mineral (vesuvianite, epidote group or the like), cyclosilicate mineral (beryl, tourmaline group or the like), inosilicate mineral (pyroxene group, amphibole group or the like), phyllosilicate mineral (mica group, clay mineral or the like), tectosilicate mineral (quartz, feldspar group, zeolite group or the like), or the like. These silicate minerals are substances constituting the earth's crust, and are widely present on the earth. Note that, with respect to type and amount of the mineral, it is possible to perform a qualitative analysis and a quantitative analysis by an analytical method such as X-ray diffraction method, X-ray fluorescence analysis, X-ray photoelectron spectroscopy (XPS, ESCA), energy dispersive X-ray spectroscopy (EDS), inductively coupled plasma emission spectrometry (ICP-AES), inductively coupled plasma mass spectrometry (ICP-MS), or atomic absorption spectroscopy (AAS).

Among the silicate minerals, it is effective to control the content of the crystalline silica (quartz: Mohs hardness 7) which is often slightly contained in cellulose pulp. There is a quartz or the like, as the crystalline silica.

The mineral having a Mohs hardness of at least 5 is often mixed in a production process of a raw material pulp of the glass interleaving paper. This is considered to be because sand and soil adhering to wood chips remain to be contained in the pulp as fine mineral particles having an average particle diameter of 300 μm or less, for the most part 100 μm or less, in a pulp production process.

As methods for reducing the mineral, which is contained in the glass interleaving paper and has a Mohs hardness of at least 5, to 400 ppm or less, there are two main methods, that is, a method for selection of the raw material pulp and a method for production process of the glass interleaving paper. For example, the former method for selection of the raw material pulp is as follows.

(1) improve control of contamination of wood as a raw material with foreign matter such as sand and soil during production of the raw material pulp (2) increase use ratio of raw wood than wood chip contaminated with more sand and soil (3) improve control of contamination of wood with foreign matter such as sand and soil during chip screening Further, as the latter method for production process of the glass interleaving paper, there is a method for removing the mineral by a dust removal device such as a cleaner or a screen in order to prevent contamination with the mineral during production of the glass interleaving paper. The cleaner is for separating the mineral in accordance with a principle of cyclone by utilizing a difference in specific gravity between the mineral and pulp fiber, and has a high effect of removing the mineral. Meanwhile, the screen is a device for removing foreign matter by using sizes of eyelets of the screen, but does not have a sufficient effect of removing the mineral when a size of the mineral is 300 μm or less. When the cleaner is used as the dust removal device, it is possible to increase efficiency of removing the mineral with the cleaner, for example, by a method of reducing a concentration of pulp slurry which is introduced into the cleaner, or by a method of increasing the number of primary cleaners or the number of stages of the primary cleaners.

The glass interleaving paper of the present embodiment is mainly made of cellulose pulp. As the cellulose pulp used for the glass interleaving paper, various types of cellulose pulps can be used alone or by mixing two or more of them. For example, the cellulose pulp includes chemical pulp such as kraft pulp (KP), sulfite pulp (SP) and soda pulp (AP); semi-chemical pulp such as semi-chemical pulp (SCP) and chemi-ground wood pulp (CGP); mechanical pulp such as groundwood pulp (GP), thermo-mechanical pulp (TMP, BCTMP) and refiner ground wood pulp (RGP); non-wood fiber pulp made from kozo (*Broussonetia kazinoki*×*B. papyrifera*), mitsumata (*Edgeworthia chrysantha*), hemp, kenaf or the like; and deinking pulp made from waste paper. In addition to these pulps, the cellulose pulp may be mixed with synthetic pulp, synthetic fiber, rayon fiber or the like. Wood used for the cellulose pulp may be softwood, hardwood, or a mixture thereof. When the raw material pulp is used, it is preferable to select pulp of low mineral content.

A basis weight of the glass interleaving paper is in a range of 10 to 100 g/m$^2$. The basis weight is preferably 35 to 80 g/m$^2$. The basis weight is preferably small because its mass is small during transportation, however, when the basis weight is less than 10 g/m$^2$, sufficient buffering property is not given. Meanwhile, when the basis weight exceeds 100 g/m$^2$, it is not preferable because its mass is large during transportation, and creping process or the like cannot be performed satisfactorily. Further, thickness of the glass interleaving paper is preferably 25 to 250 μm and more preferably 87 to 200 μm. A density of the glass interleaving paper is preferably 0.4 to 1.2 g/cm$^3$ and more preferably 0.5 to 1.1 g/cm$^3$. Note that, measurement of the basis weight of the glass interleaving paper is carried out according to JIS P8124, and measurement of the thickness and density of the glass interleaving paper is carried out according to JIS P8118.

Internal papermaking chemicals are preferably added in a range not to contaminate or scratch the surface of the glass plate. For example, the followings can be used, that is: sizing agent such as aluminum sulfate, sulfuric acid, rosin, styrene-maleic acid copolymer, alkenyl succinic anhydride or alkylketene dimer; various paper strength enhancers such as polyacrylamide; drainage retention aid; water resistant additives such as polyamide-polyamine-epichlorohydrin; softeners; antistatic agents; defoamers; slime control agents; fillers or dyes. Further, in addition to the above chemicals, it is also possible to coat or impregnate water, glass cleaner, polyvinyl alcohol, polyacrylamide, starch or the like, on the surface or back surface of the glass interleaving paper.

As a means for coating or impregnation with the above chemicals, for example, the followings can be used, that is, two-roll size press, transfer roll coater (gate roll coater, Massey coater, KCM coater, champion machine coater or the like), film transfer size press (sym-sizer, blade metering size press or the like), bill blade coater (standard coater, differential coater, combi coater), two-stream coater, Bel-Bapa coater, bar coater, blade coater, air knife coater, rod coater or calender coater.

Production conditions and production apparatus for producing the glass interleaving paper of the present embodiment are not particularly limited, and it is possible to use known production conditions and production apparatus as appropriate. For example, it is possible to make the paper as a single-layer or multi-layer paper by a Fourdrinier former, a twin wire former, a cylinder former or an inclined former. Further, in order to adjust formation and to improve smoothness of a surface of the paper and uniformity in a width direction of the paper, a dandy roll or shaking machine may be used.

The glass interleaving paper of the present invention may be subjected to the creping process or an embossing process for forming fine irregularities on the surface of the paper. The embossing process is performed by using an embosser, an uneven mold or the like, and the surface of the paper is formed into a shape such as a dot, a chain line, a straight line or a wave. A method of the creping process includes a creping method of peeling a coherent sheet by a doctor provided on a dryer or press roll in a wet part of a paper machine.

EMBODIMENTS

Hereinafter, embodiments will be described in detail, but the present invention is not limited thereto. Note that, numerical values indicating composition are numerical values based on mass of solid content or active ingredients. Further, unless otherwise stated, after a produced paper is treated in accordance with JIS P8111, the paper is subjected to measurement or test. The content of the mineral in the glass interleaving paper, scratch-giving test of the glass interleaving paper by checking the surface of the glass plate, and evaluation of scratch-giving property of the glass interleaving paper by checking the surface of the glass plate will be described in detail below.

<Content of Mineral in Glass Interleaving Paper>

Glass interleaving paper (a) about 1500 g is subjected to an ashing process in accordance with JIS P8251. Then, water 500 ml is added to ash thereof, dispersed and mixed, and slurry, which is derived from the pulp and mainly contains ash, is discharged so as not to shed the mineral settling. It is repeated three times that water 500 ml is newly added and the slurry, which is derived from the pulp and mainly contains ash, is discharged, and then ash (b) is obtained by drying those remaining finally. Next, mineral components of the ash (b) are identified by X-ray diffraction apparatus. A calibration curve with identified mineral components is created, and content ratio (c) of the mineral having a Mohs hardness of at least 5 in the ash (b) is determined by X-ray diffraction apparatus. In this way, the content of mineral in the glass interleaving paper is determined by the following equation (1). Note that, an above-mentioned purification process of the mineral by water can also be omitted. In that case, the paper subjected to the ashing process in accordance with JIS P8251 is the ash (b).

$$m=(b/a)\times c\times 1000000 \quad (1)$$

here, m: content of mineral having Mohs hardness of at least 5 (ppm)
  a: mass of glass interleaving paper (g)
  b: mass of the ash remaining finally (g)
  c: content ratio of mineral having Mohs hardness of at least 5 in the ash (b)

<Scratch-Giving Test of the Glass Interleaving Paper by Checking the Surface of the Glass Plate>

In a method of applying the glass interleaving paper of 310 mm×310 mm to the glass plate for flat panel display of 300 mm×300 mm, to perform 10 seconds press at 0.7 MPa, the press is repeated 2000 times while the glass plate for flat panel display of 300 mm×300 mm is not changed and the glass interleaving paper of 310 mm×310 mm is changed to new one at each press time, so that the glass plate for flat panel display after test is obtained.

<Evaluation of the Scratch-Giving Property of the Glass Interleaving Paper by Checking the Surface of the Glass Plate>

After brush cleaning the surface of the glass plate for flat panel display after the test, the number of scratches on the surface of the glass plate is counted visually and microscopically by spotlighting the surface of the glass plate. Evaluation of the scratch-giving property of the glass interleaving paper is performed as follows.

◎ (excellent): 0, 1 or 2 pieces of scratch
○ (good): 3 or 4 pieces of scratch
× (bad): 5 or more pieces of scratch

Embodiment 1

Paper is produced from pulp slurry of commercially available NBKP (softwood bleached kraft pulp) 100% (A) by Fourdrinier paper machine and dried, to obtain a glass interleaving paper having a basis weight of 45 g/cm². When producing the paper, the cleaner and the screen are used as the dust removal device.

Embodiment 2

Except for using commercially available NBKP 100% (B) instead of the commercially available NBKP 100% (A), the glass interleaving paper is obtained in the same manner as Embodiment 1.

Embodiment 3

When producing the paper by Fourdrinier paper machine, the glass interleaving paper is obtained in the same manner as Embodiment 2, except that a concentration of the pulp slurry is 75%, whereas a concentration of the pulp slurry during a primary cleaner process in Embodiment 2 is 100%.

Embodiment 4

When producing the paper by Fourdrinier paper machine, the glass interleaving paper is obtained in the same manner as Embodiment 2, except that the primary cleaner process is two-stage, whereas the primary cleaner process in Embodiment 2 is one-stage.

COMPARATIVE EXAMPLE 1

When producing the paper by Fourdrinier paper machine, the glass interleaving paper is obtained in the same manner as Embodiment 2, except that the concentration of the pulp slurry is 125%, whereas the concentration of the pulp slurry during the primary cleaner process in Embodiment 2 is 100%.

COMPARATIVE EXAMPLE 2

Except for using commercially available NBKP 100% (C) instead of the commercially available NBKP 100% (A), the glass interleaving paper is obtained in the same manner as Embodiment 1. Note that, the commercially available NBKP 100% (A), (B), (C) are softwood bleached kraft pulps derived from wood in different production areas.

TABLE 1

| | commercially available NBKP | primary cleaner process | | | content of mineral having Mohs hardness of at least 5 | evaluation of scratch-giving property |
|---|---|---|---|---|---|---|
| | | concentration of pulp slurry (%) | number of stages | basis weight (g/m$^2$) | | |
| Embodiment 1 | A | 100 | 1 | 45 | 20 | ◉ |
| Embodiment 2 | B | 100 | 1 | 45 | 250 | ○ |
| Embodiment 3 | B | 75 | 1 | 45 | 140 | ◉ |
| Embodiment 4 | B | 100 | 2 | 45 | 70 | ◉ |
| Comparative Example 1 | B | 125 | 1 | 45 | 850 | X |
| Comparative Example 2 | C | 100 | 1 | 45 | 1250 | X |

Table 1 shows production conditions, basis weight, content of mineral having Mohs hardness of at least 5, and the evaluation of the scratch-giving property of the glass interleaving papers in Embodiments 1 to 4 and Comparative Examples 1 to 2. By appropriately selecting the commercially available NBKP which is a raw material pulp and by using the dust removal device at appropriate conditions in the production process of the glass interleaving paper, the scratch-giving property of the glass interleaving papers in Embodiments 1 to 4 of the present invention is excellent. Meanwhile, the glass interleaving papers in Comparative Examples 1 and 2, which do not satisfy requirements of the present invention in the content of the mineral having a Mohs hardness of at least 5, have bad scratch-giving property.

The invention claimed is:

1. A glass interleaving paper, wherein a main component is cellulose pulp, a basis weight is 10 to 100 g/m$^2$, and content of mineral having a Mohs hardness of at least 5 is 20 to 400 ppm.

2. The glass interleaving paper according to claim 1, wherein the mineral having a Mohs hardness of at least 5 is a silicate mineral.

3. The glass interleaving paper according to claim 1, wherein the mineral having a Mohs hardness of at least 5 is a crystalline silica.

4. The glass interleaving paper according to claim 1, wherein content of the mineral having a Mohs hardness of at least 5 is 20 to 100 ppm.

5. The glass interleaving paper according to claim 2, wherein the mineral having a Mohs hardness of at least 5 is a crystalline silica.

6. The glass interleaving paper according to claim 2, wherein content of the mineral having a Mohs hardness of at least 5 is 20 to 100 ppm.

7. The glass interleaving paper according to claim 2, wherein the silicate mineral is any one of nesosilicate mineral, sorosilicate mineral, cyclosilicate mineral, inosilicate mineral, phyllosilicate mineral, or tectosilicate mineral.

* * * * *